United States Patent [19]

Tabuchi

[11] Patent Number: 5,698,960
[45] Date of Patent: Dec. 16, 1997

[54] MOTOR SERVO SYSTEM

[75] Inventor: Junichiro Tabuchi, Osaka, Japan

[73] Assignee: Sanyo Electric Co., Ltd., Osaka, Japan

[21] Appl. No.: 493,750

[22] Filed: Jun. 22, 1995

[30] Foreign Application Priority Data

Jun. 23, 1994 [JP] Japan ................................. 6-141380

[51] Int. Cl.⁶ ................................................ G05B 1/06
[52] U.S. Cl. .................. 318/638; 318/568.22; 318/629; 318/632; 318/600; 318/798-815
[58] Field of Search ......................... 318/638, 138, 318/254, 439, 632, 798–815, 569, 629, 568.22, 600, 567, 560

[56] References Cited

U.S. PATENT DOCUMENTS

| 3,979,651 | 9/1976 | Bringol | 318/138 |
| 4,780,651 | 10/1988 | Nakano et al. | 318/254 |
| 5,175,479 | 12/1992 | Tajima et al. | 318/560 |
| 5,196,771 | 3/1993 | Naito | 318/254 |

FOREIGN PATENT DOCUMENTS

| 0 590 653 A1 | 4/1994 | European Pat. Off. |
| 0 599 190 A2 | 6/1994 | European Pat. Off. |
| 41 11 007 A1 | 10/1992 | Germany |

OTHER PUBLICATIONS

Patent Abstracts of Japan, Vo. 11, No. 346 (E–556) [2793], Nov. 12, 1987 and JP 62126882(1) Abstract.

Primary Examiner—Karen Masih
Attorney, Agent, or Firm—Armstrong, Westerman, Hattori, McLeland & Naughton

[57] ABSTRACT

A motor servo system includes a microcomputer which obtains FG period data in response to an FG signal outputted from a capstan motor, and calculates rotation unevenness associate data D1 by totalizing (a hundred) absolute values of differences between each of respective FG period data and theoretical values. The microcomputer adjusts a gain of a servo circuit by comparing the rotation unevenness associate data D2 calculated at the last time and the rotation unevenness associate data D1 calculated at this time. That is, if D1>D2, a corrective gain ΔG is inverted and stored into a memory as data D3. A new gain is determined by adding the data D3 and a present gain G.

8 Claims, 6 Drawing Sheets

1

MOTOR SERVO SYSTEM

BACKGROUND OF THE INVENTION

1. Field of the Invention

The present invention relates to a motor servo system. More specifically, the present invention relates to a motor servo system in which a rotation speed of a motor is controlled on the basis of a rotation signal outputted from the motor such as an FG signal.

2. Description of the Prior Art

In such a kind of motor servo system, in the past, a servo characteristic is determined at a time that the system is designed in a manner that rotation unevenness of the motor becomes minimum.

However, in a VCR or VTR, since loads at a top and an end of a tape are largely different from each other due to differences of winding diameters of a tape supply reel, there was a problem that as shown in FIG. 6(A) and FIG. 6(B), the rotation unevenness of a capstan motor and a cylinder motor at the top or the end of the tape become large. As to the cylinder motor, specifically, the load is varied within a range of 10±3 grams between the top and the end of the tape.

Furthermore, due to mismatchings of servo systems and a mechanical system (motor) of the cylinder motor and the capstan motor, there was a case where the rotation unevenness occurs during a whole length of the tape as shown in FIG. 6(C). In such a case, it is necessary to adjust the servo characteristic according to a characteristic of each motor, and therefore, there was a problem that it takes a long time for manufacturing the product.

SUMMARY OF THE INVENTION

Therefore, a principal object of the present invention is to provide a motor servo system capable of preventing rotation unevenness easily.

A motor servo system according to the present invention relates to a motor servo system in which a rotation speed of a motor is controlled on the basis of a rotation signal outputted from the motor, and comprises: period measuring means for measuring a period of the rotation signal on the basis of the rotation signal so as to obtain period data; detecting means for obtaining associate data associated with rotation unevenness of the motor on the basis of the period data; and adjusting means for adjusting a gain of the servo system on the basis of the associate data.

The period measuring means which is constituted by a microcomputer, for example, evaluates the period data of an FG signal for each FG signal outputted from a capstan motor, for example, and the detecting means which is also constituted by the microcomputer, for example, calculates rotation unevenness associate data by totalizing absolute values of differences between the values of the period data and theoretical values. The detecting means calculates the rotation unevenness associate data at every timing that the FG signal period data are sampled a hundred (100) times. In the adjusting means which is constituted by the microcomputer, for example, if the rotation unevenness associate data D1 detected at this time is larger than the rotation unevenness associate data D2 detected at the last time, a corrective gain ΔG is inverted, for example, and an inverted corrective gain ΔG is written in a memory, and by adding the corrective gain ΔG and a present gain G, a gain G is determined.

A content of the memory is re-written with an inverted corrective gain ΔG at a time that the corrective gain ΔG is inverted again when the associate data D1 becomes larger than the associate data D2. Therefore, the gain G thus determined is increased or decreased at every timing that a comparison result of the associate data D1 and D2 is changed. Therefore, the gain G is repeated to increase or decrease within a predetermined range. Accordingly, the associate data that will be detected at a next time is changed, and thus, the period data is changed, and therefore, the period data approaches the theoretical value, and accordingly, the rotation unevenness of the capstan motor can be reduced.

In accordance with the present invention, since the gain is adjusted by the adjusting means, it is possible to easily reduce the rotation unevenness.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
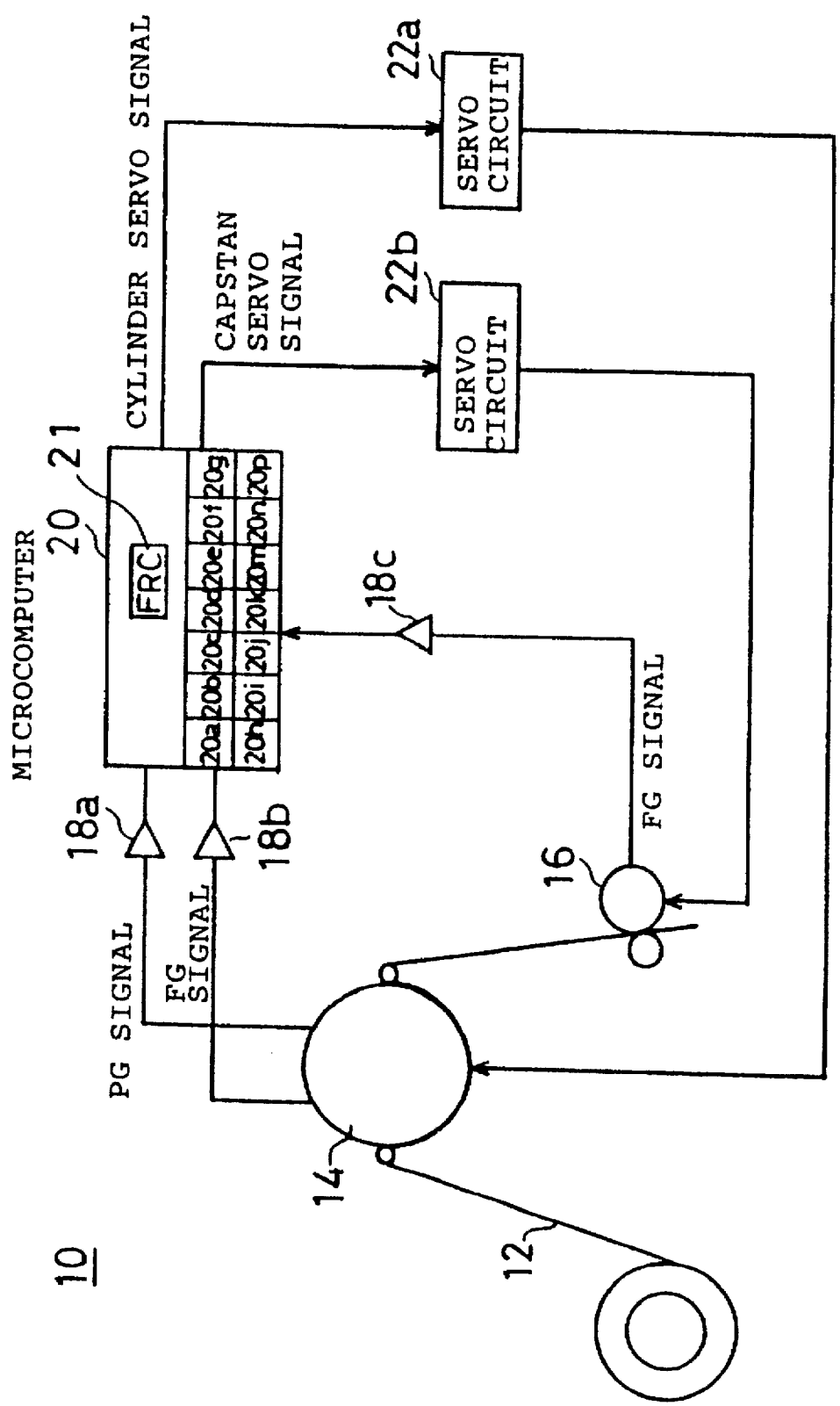
FIG. 1 is a block diagram showing one embodiment according to the present invention.

With reference to FIG. 1, a video tape recorder 10 of this embodiment shown includes a cylinder 14 for reproducing a video signal recorded on a video tape 12, and a capstan motor 16 for running the video tape 12. A PG signal and an FG signal generated by the cylinder motor 14 are applied to a microcomputer 20 via amplifiers 18a and 18b, respectively, and an FG signal generated by the capstan motor 16 is applied to the microcomputer 20 via an amplifier 18c.

The microcomputer 20 performs a predetermined process on the basis of the PG signal and the FG signal from the cylinder motor 14 so as to output a cylinder servo signal for a servo circuit 22a, and another predetermined process on the basis of the FG signal from the capstan motor 16 so as to output a capstan servo signal for a servo circuit 22b. The servo circuits 22a and 22b drive the cylinder motor 14 and the capstan motor 16, respectively, on the basis of the cylinder servo signal and the capstan servo signal.

Furthermore, the microcomputer 20 has a free-run counter (hereinafter, called as "FRC") 21 in a part of its memory thereof, and the FRC 21 is incremented by a system clock of the microcomputer 20. Therefore, by sampling a count value of the FRC 21 for each FG signal, a time from the FG signal at the last time to the FG signal at this time, i.e., an FG signal period can be measured. In addition, in this embodiment shown, it is necessary to measure periods of the FG signal and the PG signal from the cylinder motor 14 and a period of the FG signal from the capstan motor 18, three FRCs are required; however, in order to simplify, only one FRC 21 is illustrated in FIG. 1.

Next, with reference to an FG interrupt routine shown in FIG. 2, an operation of the microcomputer 20 for outputting the cylinder servo signal will be described. First, in a step S1, according to the above described method, the period of the FG signal is measured, and the period is written in a memory 20a as a measured value A. Next, in a step S3, an absolute value C of a difference between the measured value A and a theoretical value B is evaluated, and the absolute value C is written in a memory 20b. In addition, the theoretical value B means period data of a case where no rotation unevenness occurs. Thereafter, in a step S5, the absolute value C evaluated at this time is added to a total sum D1 of the absolute values evaluated before, and an addition result is written in a memory as a new total sum D1. Succeedingly, in a step S7, a counter 20d is incremented, and in a step S9, it is determined whether or not a count value of the counter 20d becomes larger than "100", for example. That is, the counter 20d is a counter for determining whether or not the absolute value C is totalized a hundred (100) times. If "NO" is determined in the step S9, the process proceeds to a step S23. If "YES" is determined, in a step S11, the counter 20d is reset.

In addition, the cylinder motor 14 is rotated 30 times for one (1) second, and the FG signal is outputted twelve (12) times for one (1) rotation, and therefore, it takes 1/3.6 seconds (8.3 rotations) for totalizing one hundred absolute values C.

Thereafter, in a step S13, a total sum D1 evaluated at this time is compared with a total sum D2 which has been evaluated and written in a memory 20e. If D1>D2, in a step S17, a corrective gain ΔG is inverted, and an inverted corrective gain ΔG is written in the memory 20e as data D3, and then, the process proceeds to a step S15; however, if D1≦D2, the process directly proceeds to the step S15.

In addition, in this embodiment shown, the corrective gain ΔG is ½$^8$ of a present gain G.

In the step S15, the data D3 of the memory 20e is added to the present gain G to obtain a new gain G. That is, in the step S15, the gain G is increased or decreased until a time that the data D1 becomes equal to or smaller than the data D2, and when it is determined that the data D1 is larger than the data D2 in the step S13, the gain G is continuously decreased or increased until a time that D1≦D2. In other words, in the step S15, on the basis of the total sum D1 (and D2) that is rotation unevenness associate data, the corrective gain ΔG is added to or subtracted from the present gain G.

Succeedingly, in a step S21, the total sum D1 is written in a memory 20f as the total sum D2, and in a step S23, the memory 20c is initialized. Thereafter, in steps S25 and S27, a speed error and a phase error are respectively calculated with utilizing the FG signal and the PG signal, and in a step S29, the speed error and the phase error evaluated in the steps S25 and S25 are added to each other, and an addition result is written in a memory 20g as an added value F. Then, in a step S31, the gain G is multiplied by the added value F, and a multiplication result is made as a cylinder servo signal.

Figure 2:
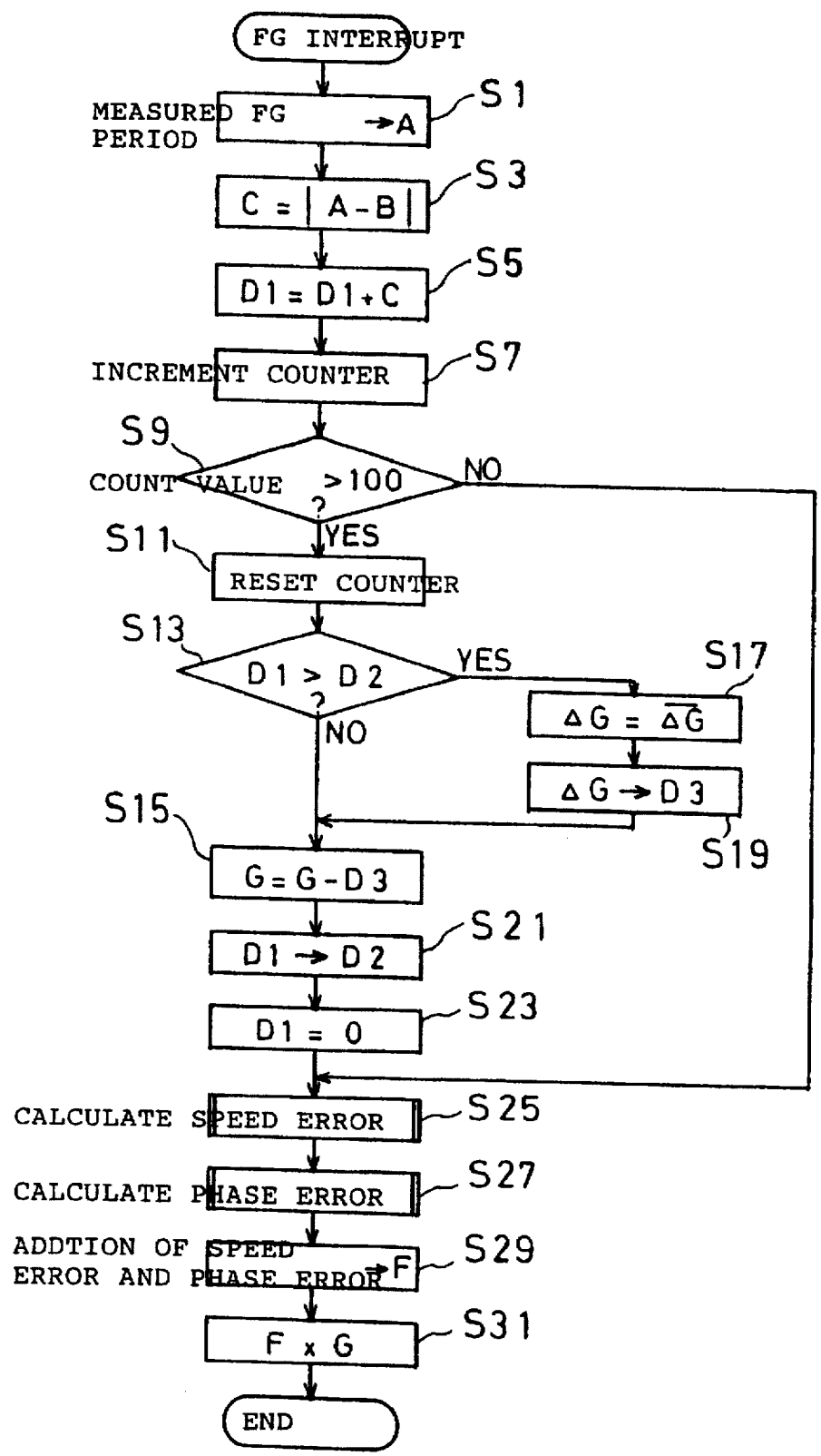
FIG. 2 is a flowchart showing a part of an operation of FIG. 1 embodiment.
Figure 3:
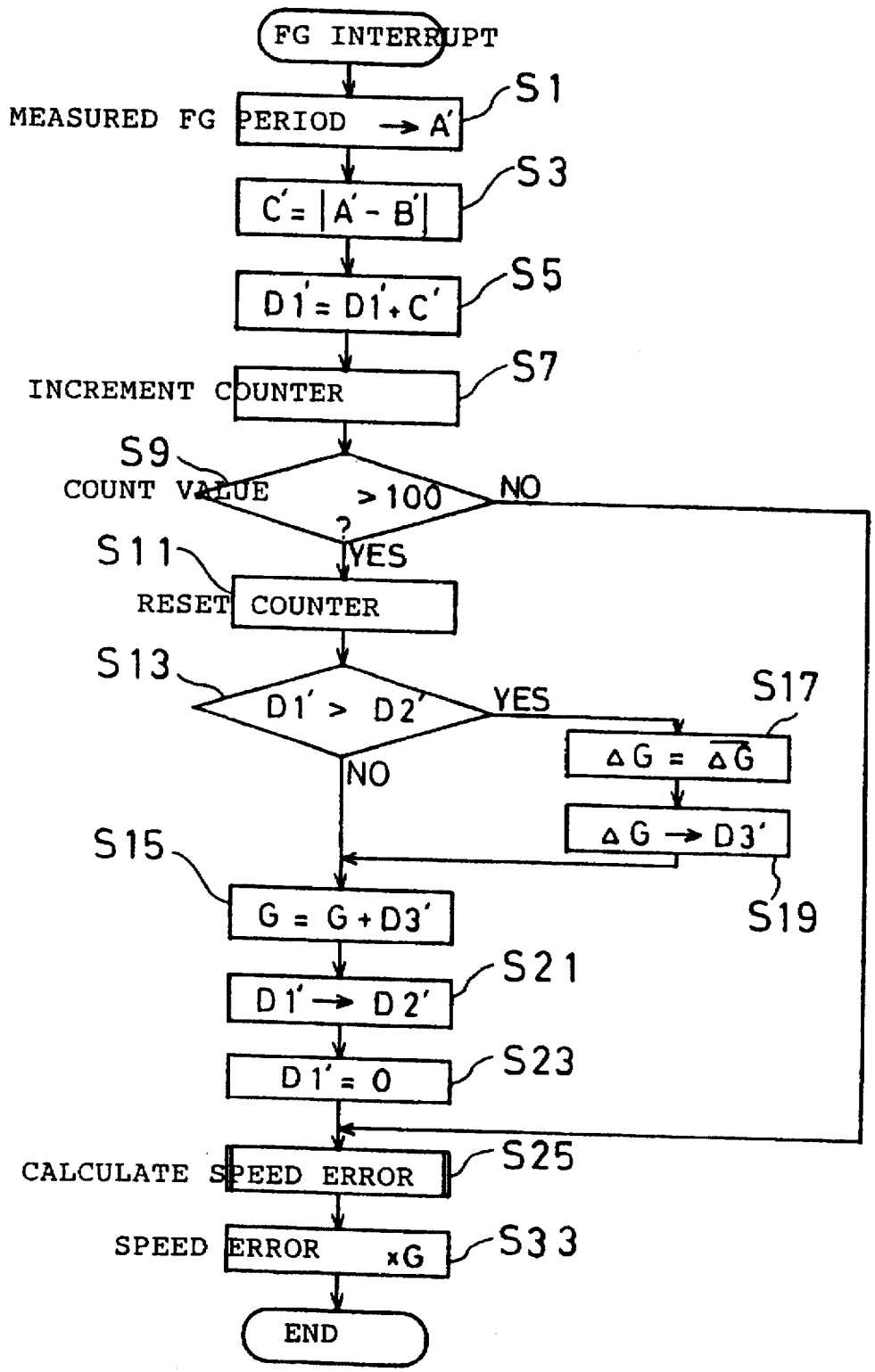
FIG. 3 is a flowchart showing another part of the operation of the FIG. 1 embodiment.

An operation of the microcomputer 20 for outputting the capstan servo signal is shown in FIG. 3; however, FIG. 3 operation is similar to FIG. 2 operation, and therefore, the same step numbers are applied to the same or similar steps, and a duplicate description will be omitted here.

In the step S3, a theoretical value B' which is different from the theoretical value B is used, and in a step S33, the capstan servo signal can be evaluated by multiplying the speed error calculated in the step S25 and the gain G calculated in the step S15. Furthermore, a measured value A', an absolute value C', a total sum D1', a total sum D2' and data D3', and the speed error are written in memories 20h, 20i, 20j, 20k, 20l, 20m and 20n, and a counter 20p is incremented in the step S7.

In addition, the capstan motor 16 is rotated two (2) times for one (1) second, and the FG signal is generated three-hundred (300) times for one (1) rotation, and therefore, in the step S5, it takes 1/6 seconds (1/3 rotations) for totalizing one hundred absolute values.

Figure 4A:
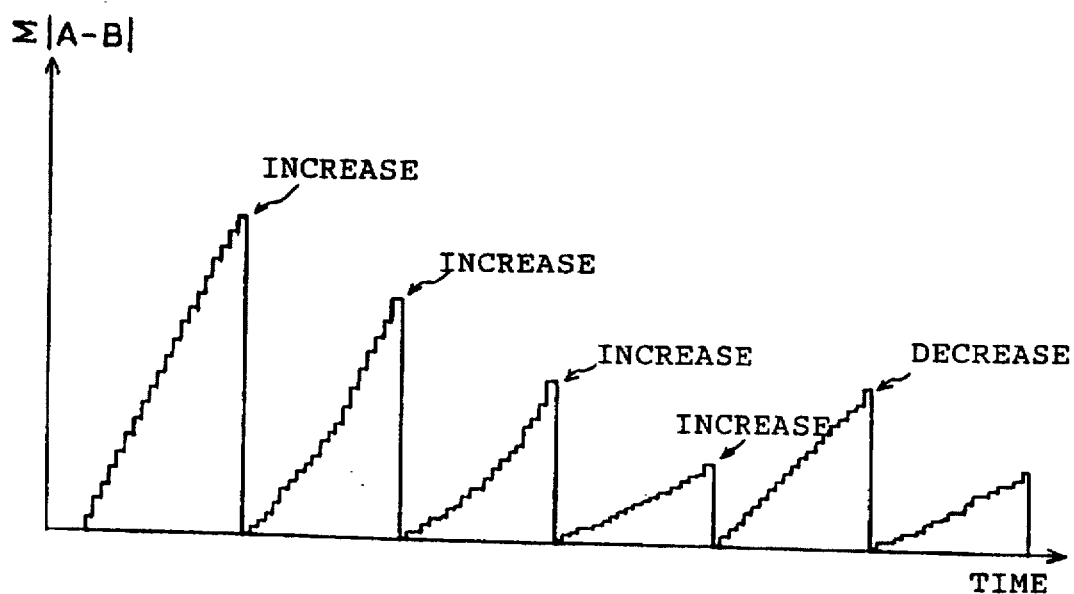
FIG. 4(A) and FIG. 4(B) are illustrative views showing portions of the operation of FIG. 1 embodiment.

Next, with reference to FIG. 4(A) and FIG. 4(B), an operation of the video tape recorder 10 will be described. First, if the total sum D1 evaluated by increasing the gain G at this time is still smaller than the total sum D2 at the last time as shown in FIG. 4(A), the gain 6 is further increased. After the gain G is continuously increased, if the total sum D1 becomes larger than the total sum D2, the corrective gain ΔG is inverted and added to the present gain G, thereby to decrease the gain G. Thereafter, by repeating the increase or decrease of the gain G, the gain G applied to the servo circuit 20a or 20b is changed within a predetermined range.

Figure 4B:
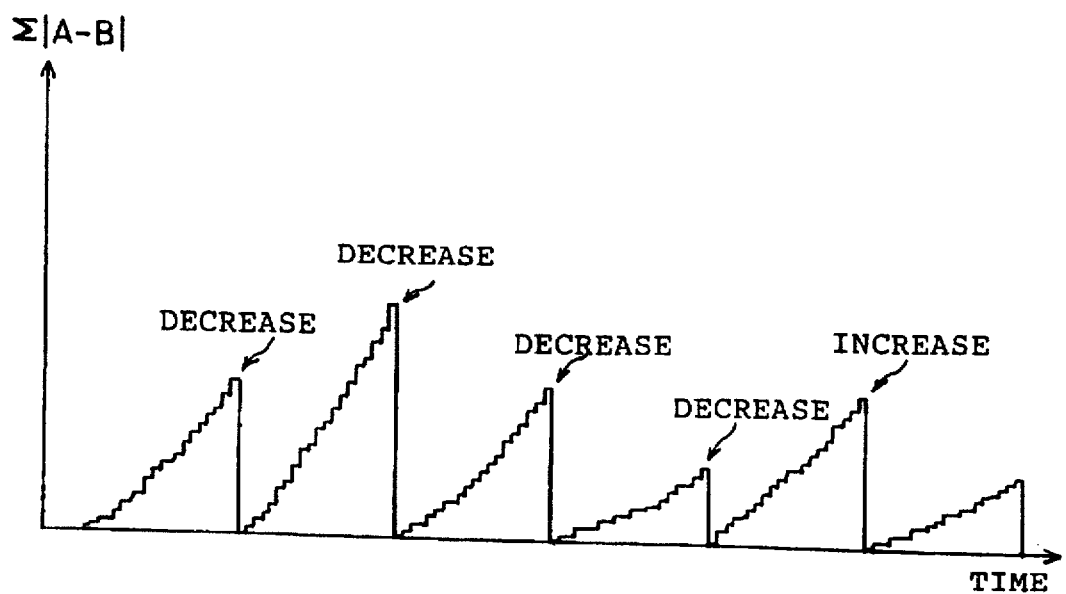

Furthermore, if the total sum D1 evaluated by increasing the gain G at this time becomes larger than the total sum D2 at the last time as shown in FIG. 4(B), the gain G is decreased. Thereafter, the gain G is continuously decreased while the total sum D1 is smaller than the total sum D2, and if the total sum D1 becomes larger than the total sum D2, the corrective gain ΔG is inverted again, thereby to increase the gain G. Thereafter, by repeating the increase or decrease of the gain G, the gain G applied to the servo circuit 20a or 20b is changed within a predetermined range.

Figure 5:
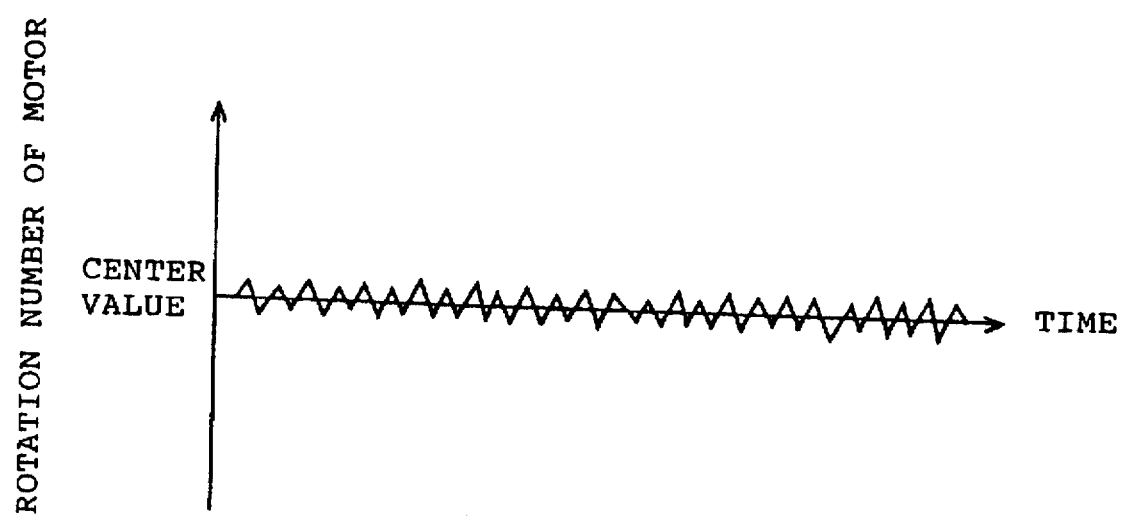
FIG. 5 is an illustrative view showing a portion of the operation of the FIG. 1 embodiment.
Figure 6A:
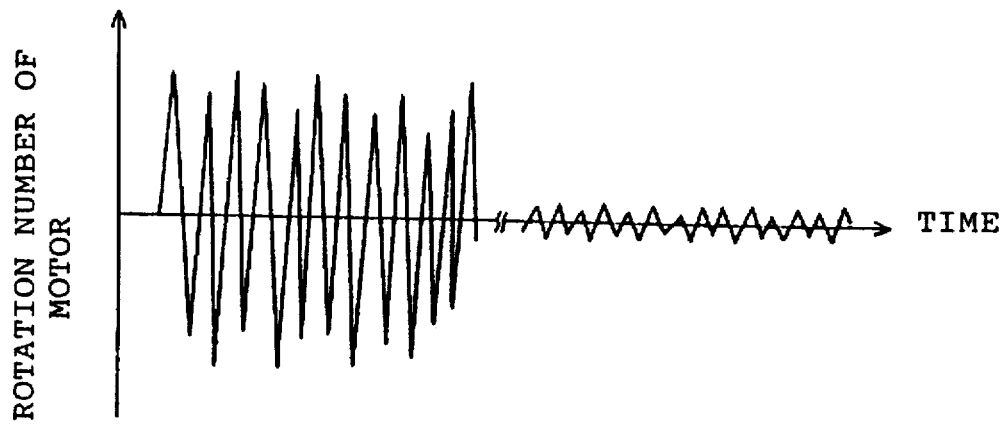
FIG. 6(A), FIG. 6(B) and FIG. 6(C) are illustrative views showing portions of an operation of the prior art.
Figure 6B:
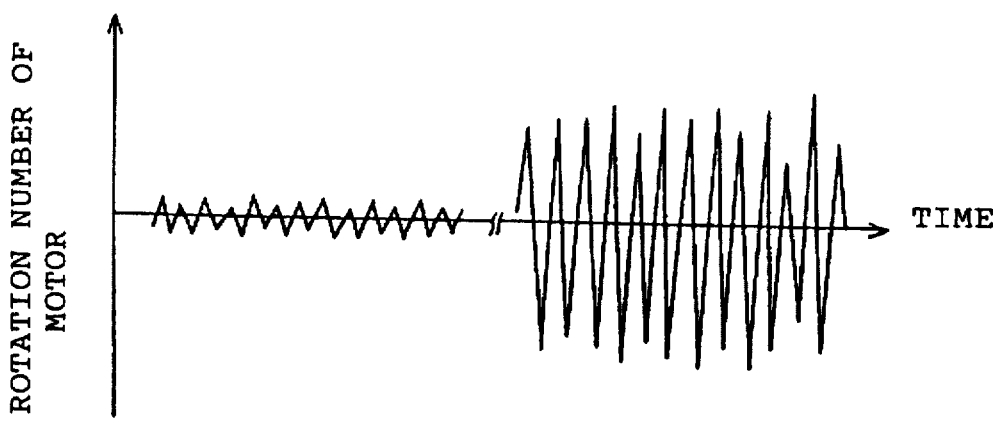
Figure 6C:
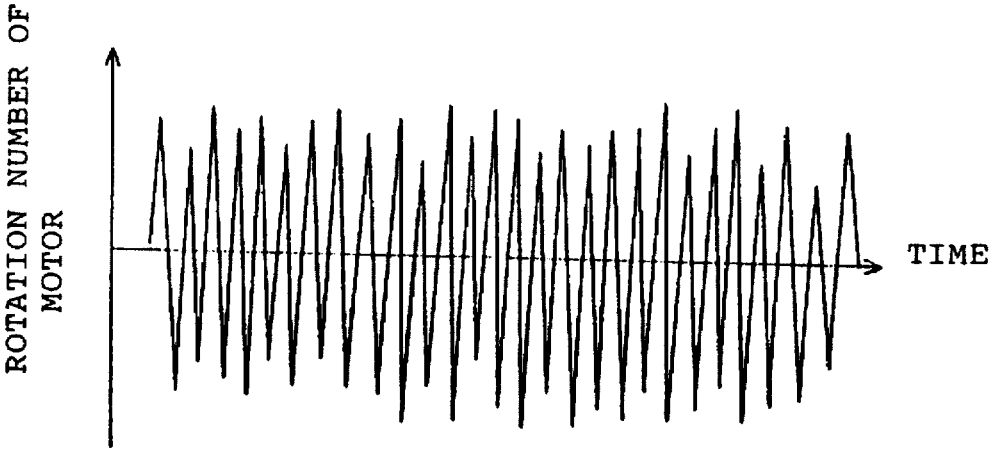

Thus, by comparing the total sum D1 and the total sum D2, the gain G is increased or decreased, and therefore, the total sum D1, i.e. the measured value A is changed, whereby the measured value A approaches the theoretical value B, and therefore, the cylinder motor 14 or the capstan motor 16 is rotated with the rotation unevenness within the predetermined range as shown in FIG. 5. Therefore, the rotation unevenness of the cylinder motor 14 or the capstan motor 18 can be drastically reduced.

According to this embodiment shown, since the gain is adjusted by detecting the absolute value of the difference between the period of the FG signal and the theoretical value of that period, it is possible to easily reduce the rotation unevenness of the cylinder motor 14 or the capstan motor 18 due to a mismatching of the servo system and the mechanical system or the change of load.

In the above described embodiment, the video tape recorder is described; however, the present invention can be, of course, applied to a spindle motor of a compact disc player, a laser disc player, a mini-disc player or the like, or a capstan motor and a cylinder motor of a digital audio tape recorder, or a capstan motor of a cassette tape recorder.

Furthermore, in the above described embodiment, the corrective gain ΔG=½$^8$; however, as a power of exponent of "2", 6≦n≦8 may be selected as a value at which no rotation unevenness is detected by adjusting the gain G.

Furthermore, in the above described embodiment, one hundred absolute values C are totalized; however, the number of the value C may be selected within a range of 100≦N≦1000 as a value at which the total sum D1 can not be averaged.

In addition, in the above described embodiment, the total sum D1 is evaluated at every timing that the FC period data is sampled one hundred (100) times; however, the total sum of one hundred (100) absolute values may be evaluated at every timing the FG period data is sampled once. However, in such a case, the power of exponent of "2" in the corrective gain ΔG is to be increased by "1" in comparison with the former case. The reason is that in the latter case, since the detection period of the total sum D1 becomes 1/100, if the width of the corrective gain ΔG is not made small, the gain G is largely changed, and therefore, there is a possibility that the rotation unevenness due to the variation of the gain becomes to be detected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor servo method for controlling a rotational speed of a motor on the basis of a rotation signal outputted from the motor, comprising the steps of:

measuring a period of the rotation signal so as to obtain period data;

obtaining data associated with rotation unevenness of the motor according to the period data; and adjusting a gain of the servo system according to the associated data, wherein said obtaining step includes:

calculating an absolute value of a difference between a value of the period data and a theoretical value; and calculating the associated data by totalizing a plurality of absolute values.

2. A motor servo method according to claim 1, wherein said adjusting step further comprises the steps of:

comparing the associated data at a preceding time and the associated data at a succeeding time; and changing the gain G by adding or subtracting a predetermined corrective gain ΔG to or from the gain G according to a result produced by said comparing step.

3. A motor servo method for controlling a rotational speed of a motor on the basis of a rotation signal outputted from the motor, comprising the steps of:

measuring a period of the rotation signal so as to obtain period data;

obtaining data associated with rotation unevenness of the motor according to the period data;

comparing the associated data at a preceding time and the associated data at a succeeding time; and changing a gain G of the servo system by adding or subtracting a predetermined corrective gain ΔG to or from the gain G according to a result produced by said comparing step, including the sub-steps of:

inverting the corrective gain ΔG at a time that the associated data at the present time is greater than the associated data at a previous time;

holding the corrective gain ΔG which is inverted by inverting means until a time of a next inversion; and adding the corrective gain ΔG being held by the holding means to the gain G.

4. A motor servo method according to claim 3, wherein the corrective gain ΔG is set as $½^n$ of the gain G, where n=6 to 9.

5. A motor servo system for controlling a rotational speed of a motor, comprising:

means for outputting a rotation signal of a motor;

control means for measuring a period of the rotation signal so as to obtain period data, obtaining data associated with rotation unevenness of the motor according to the period data, and adjusting a gain of the servo system according to the associated data, wherein control means calculates an absolute value of a difference between a value of the period data and a theoretical value and calculates the associated data by totalizing a plurality of absolute values.

6. A motor servo system according to claim 5, wherein said control means compares the associated data at a preceding time and the associated data at a succeeding time, and changes the gain G by adding or subtracting a predetermined corrective gain ΔG to or from the gain G according to a comparison result.

7. A motor servo system for controlling a rotational speed of a motor, comprising:

means for outputting a rotation signal of a motor;

control means for measuring a period of the rotation signal so as to obtain period data, obtaining data associated with rotation unevenness of the motor according to the period data, and adjusting a gain of the servo system according to the associated data wherein said control means compares the associated data at a preceding time and the associated data at a succeeding time, and changes the gain G by adding or subtracting a predetermined corrective gain ΔG to or from the gain G according to a comparison result, wherein said control means inverts the corrective gain ΔG at a time that the associated data at the present time is greater than the associated data at a previous time, holds the inverted corrective gain ΔG which is inverted until a time of a next inversion, and adds the corrective gain ΔG being held to the gain G.

8. A motor servo system according to claim 7, wherein the corrective gain ΔG is set as $½^n$ of the gain G, where n=6 to 9.

* * * * *